United States Patent [19]
Grant

[11] Patent Number: 5,415,364
[45] Date of Patent: May 16, 1995

[54] WIRE CUTTER SYSTEM HAVING AERODYNAMIC, MICROWAVE ENERGY ABSORBING FAIRING

[75] Inventor: Peter L. Grant, Hamden, Conn.

[73] Assignee: Untied Technologies Corporation, Hartford, Conn.

[21] Appl. No.: 118,551

[22] Filed: Sep. 9, 1993

[51] Int. Cl.⁶ .............................................. B64C 27/00
[52] U.S. Cl. .................................. 244/17.11; 244/121
[58] Field of Search ................. 244/17.11, 121, 129.1, 244/1 R, 130, 133; 30/296 R, 296 A, 314, 315; 83/639.5; 42/90; 89/1.11; 114/221 A

[56] References Cited

U.S. PATENT DOCUMENTS

| | | | |
|---|---|---|---|
| 4,215,833 | 8/1980 | Chan | 244/17.1 |
| 4,726,980 | 2/1988 | Ishikawa et al. | 244/133 A |
| 4,924,228 | 5/1990 | Novak et al. | 244/133 A |
| 5,288,036 | 2/1994 | Kompare | 244/17.11 |

Primary Examiner—Galen L. Barefoot
Attorney, Agent, or Firm—Michael Grillo

[57] ABSTRACT

A fairing 122 is provided for covering a wire strike cutter 120. The fairing 122 comprises a microwave energy absorbing core 150 covered by dielectric skin 160,161,165,166. The fairing 122 reduces the radar signature of the wire cutter and fractures in response to a wire strike so as to permit the cutter to capture and cut a wire/cable. At least one projection 135 is formed on the fairing 122 for catching a slack wire/cable as it slides up the fairing, the projection holds the wire/cable until tension develops to fracture the fairing, thereby permitting the wire/cable to pass through to the wire cutter where it is subsequently cut. The fairing 122 minimizes drag and improves the aircraft's aerodynamic characteristics by directing the airflow around the wire cutter and equipment adjacent to the wire cutter.

14 Claims, 7 Drawing Sheets

WIRE CUTTER SYSTEM HAVING AERODYNAMIC, MICROWAVE ENERGY ABSORBING FAIRING

The Government has rights in this invention pursuant to Contract No. DAAJ09-91-C-A004 awarded by the Department of the Army.

TECHNICAL FIELD

The present invention relates to wire cutter systems for aircraft, and more particularly to a wire cutter system having a microwave energy absorbing fairing for covering a wire cutter, the fairing fracturing in response to a wire/cable strike, thereby permitting the wire/cable to engage the cutter.

BACKGROUND OF THE INVENTION

Aircraft flight operations may involve patterns that occur in close proximity to the ground. Helicopter flight operations, in particular, typically involve a significant amount of flight time in close proximity to the ground. This is particularly true of military helicopters with the advent of more sophisticated avionics and flight equipment that make nap-of-the-earth flight operations feasible as a routine tactical flight philosophy.

Helicopter flight operations in close proximity to the ground are subject to two serious types of ground threats: ground fire (active); and wire/cable strikes (passive). These ground threats have become a serious concern with the increasing emphasis on nap-of-the-earth helicopter flight operations.

During the Vietnam war, many helicopters were neutralized or destroyed as a result of encounters with steel cables stretched between trees. Such cables were purposely positioned to rap around the helicopter rotor head to disable the helicopter, or, if the speed of the helicopter was sufficiently high, to tear through the helicopter fuselage for complete destruction thereof. To mitigate this liability at low level helicopter flight operations, wire cutter systems were developed and incorporated into the basic helicopter configuration. Such wire cutter systems are operative to deflect wires/cables encountered during low level flight operations into the throat of a wire cutter. The momentum of the helicopter, in combination with the sharpness of the cutter blades, is sufficient to sever a wire/cable before damage can be inflicted upon the helicopter.

Wire cutter systems are currently utilized on helicopters engaged in low level flight operations where there is a high probability of encountering wires/cables. For example, almost all military helicopters incorporate wire cutter systems. In addition, federal and state helicopters utilized in illegal alien operations typically incorporate wire cutter systems. It is not uncommon for such helicopters to strike numerous telephone and/or power lines while engaged in nap-of-the-earth flight operations. Telephone and/or power lines in themselves are not the primary concerns, but rather the steel cables (up to ⅜ in. diameter) that are disposed in combination with such lines for the support thereof. These steel cables are similar to the type encountered during the Vietnam war.

Although wire cutter systems provide increased survivability in the event of a wire/cable strike, difficulty arises when low observability is required in a helicopter design. The wire cutter system cutting jaws (blades) are primarily composed of steel which reflects microwave energy, and therefore increase the radar signature of the aircraft. Additionally, wire cutters are typically mounted above or in front of the basic aerodynamic fairings on the helicopter. Therefore, the aerodynamic shape of the aircraft may be altered, further increasing the aircraft's radar signature. It has also been found that wire cutter blades manufactured of composite materials to reduce the returned radar energy are not a viable alternative to steel because of strength requirements. Another problem that must be dealt with by current wire cutter systems is the ability to sever slack wire and cables, such as those which unwrap after the launch of a missile, e.g., a TOW missile. Such slack wires/cables may cause serious damage to a helicopter by becoming entangled in the main rotor push rods, or in the main rotor itself.

SUMMARY OF THE INVENTION

Objects of the invention include the provision of a wire cutter system for protection of an aircraft against wire/cable strikes, the wire cutter system having a reduced radar signature.

Another object of the invention is to provide a wire cutter system capable of severing slack wires and cables.

A further object of the present invention to provide an aircraft wire cutter system having improved aerodynamic characteristics.

According to the present invention, a fairing is provided for covering a wire strike cutter, the fairing being manufactured of a microwave energy absorbing material which reduces the radar signature of the wire cutter, the fairing fractures in response to a wire strike so as to permit the cutter to capture and cut a wire/cable.

In further accord with the present invention, the fairing is provided with at least one projection for catching a slack wire/cable as it slides up the fairing, the projection holds the wire/cable until tension develops to fracture the fairing, thereby permitting the wire/cable to pass through to the wire cutter where it is subsequently cut.

In still further accord with the present invention, the fairing minimizes drag and improves the aircrafts aerodynamic characteristics by directing the airflow around the wire cutter and equipment adjacent to the wire cutter.

The present invention provides a significant improvement over the prior art because a wire cutter system is provided having a low observability characteristic during normal operations, and which provides for reliable wire/cable cutting in response to the aircraft encountering a wire or cable. The fairing which covers the cutter may be manufactured of a known composite material having the desirable quality of absorbing microwave energy, thereby minimizing radar reflections. The fairing is designed to easily fracture in response to tension applied by a wire or cable so that the wire or cable may be received into the jaws of the cutter and subsequently cut. The fairing also directs the flow of air around the wire cutter and adjacent equipment to thereby minimize drag and improve aerodynamic performance.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

Figure 1:
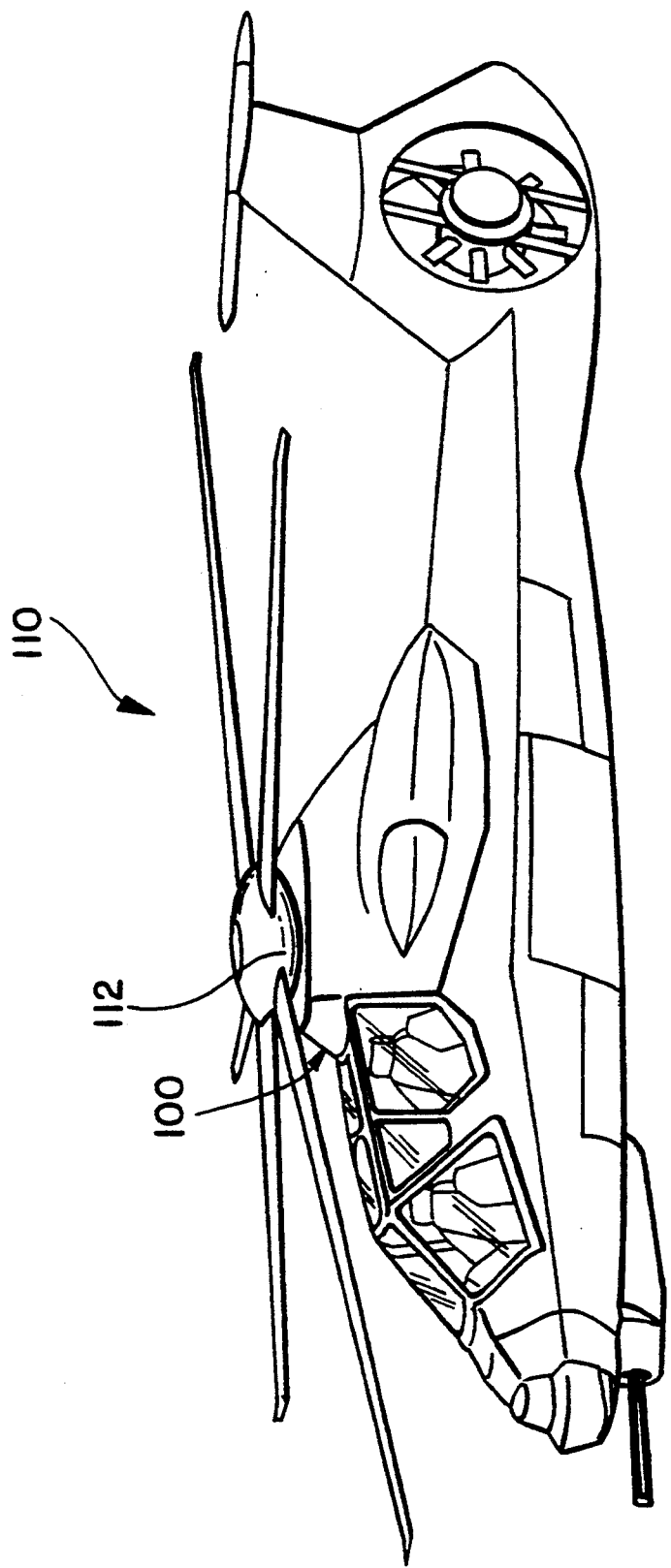
FIG. 1 is a perspective view of a helicopter having the wire cutter system of the present invention.

Referring to FIG. 1, the wire cutter system 100 of the present invention is shown installed on a helicopter 110. The system of the present invention is illustrated as being used with a wire cutter located at the leading edge fairing of the main rotor pylon 112. However, the wire cutter system of the present invention may be used with a wire cutter located at various locations on the airframe of a helicopter to provide the desired wire/cable cutting capabilities for preventing damage from a wire or cable strike.

Figure 2:
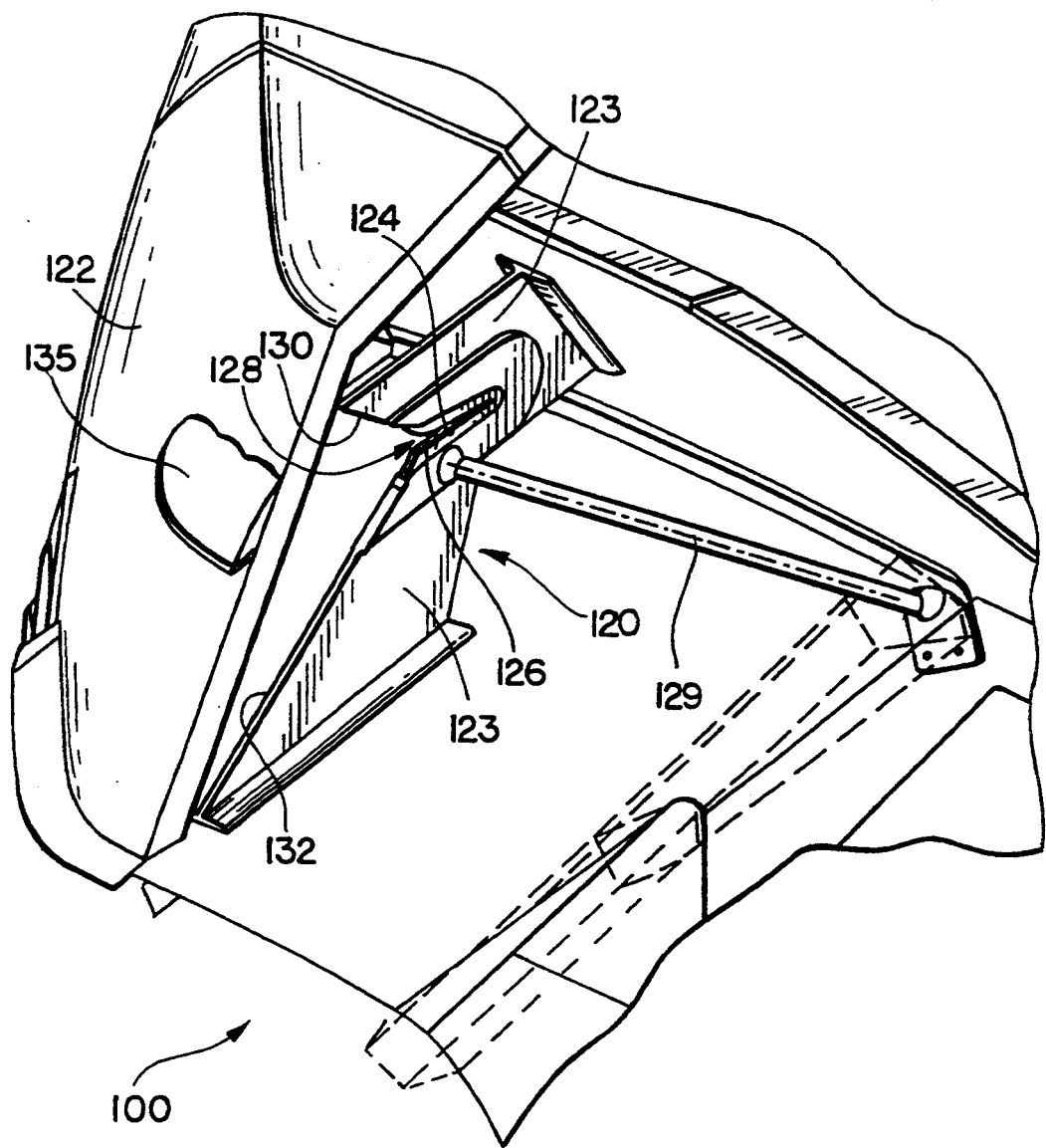
FIG. 2 is an enlarged view of the wire cutter system of FIG. 2, partially broken away, showing a wire cutter positioned behind a diverter fairing.
Figure 3:
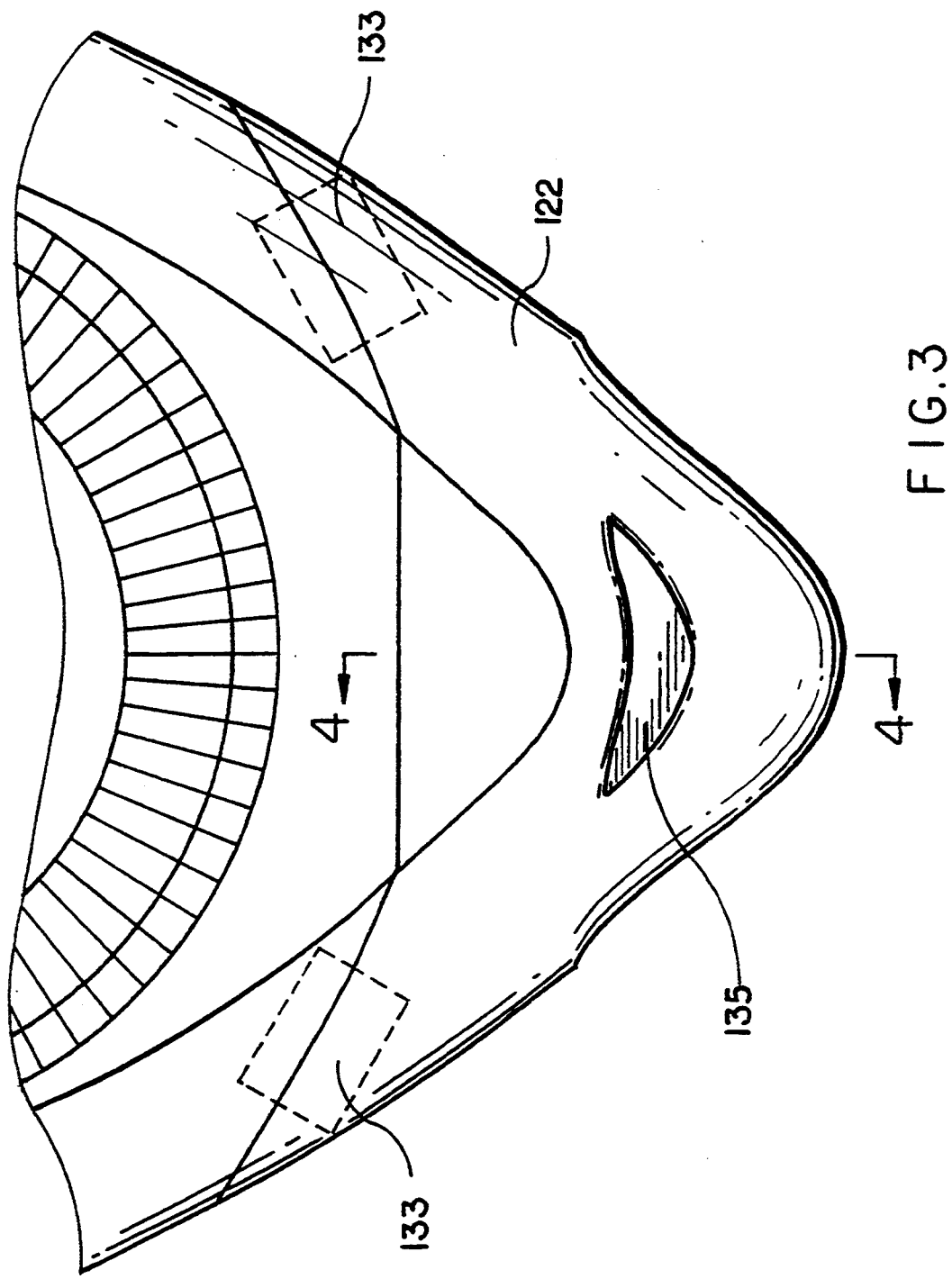
FIG. 3 is a top view of the diverter fairing of FIG. 2.

Referring now to FIGS. 2 and 3, the wire cutter system 100 comprises a hard mounted wire cutter 120 and a diverter fairing 122. The wire cutter 120 is operative to sever incident wires/cables, during forward flight of the aircraft, before such wires/cables inflict damage on the aircraft rotor head 112 (FIG. 1 ). The embodiment of the wire cutter 120 described herein is a conventional wire cutter of the type manufactured for aerospace applications, e.g., of the type manufactured by Bristol Aerospace.

The wire cutter 120 comprises a housing 123 formed of a light weight, rigid material such as aluminum. Upper and lower cutting jaws 124,126 are mounted in the housing 123. The upper and lower cutting jaws 124,126 have lengths and angles generally known to those skilled in the art for utility in severing wires/cables encountered during flight operations. The cutting jaws 124,126 are fabricated from high strength materials such as stainless steel. Optionally, the cutting jaws 124,126 may be coated with rubber to protect the jaws 124,126 prior to an initial wire/cable strike. The upper and lower cutting jaws 124,126 in combination define a cutting throat 128 for the wire cutter 120 that provides the capability to accommodate wires/cables of up to ⅜ in. diameter.

The wire cutter 120 is hard mounted to provide protection from wire/cable strikes such that incident wires/cables are deflected into the throat 128 of the wire cutter 120 and severed by the upper and lower cutting jaws 124,126 before impact with the rotor head 112 (FIG. 1). The wire cutter 120 may be further supported by a strut 129 to provide a secure, hard mount. To enhance the protective capability of the wire cutter 120 against wire/cable strikes, an upper leading edge 130 and a lower leading edge 132 of the housing 123 are configured to provide a shallow incident angle (for the described embodiment, an incident angle of about 30 degrees to incident wires/cables sliding along the aircraft airframe) that deflects such wires/cables into the throat 128 of the wire cutter 120 for severance thereof.

The diverter fairing 122 provides the leading edge fairing of the main rotor pylon 112 as illustrated in FIG. 1. The fairing 122 is a non-structural composite material and serves both aerodynamic and radar signature reduction purposes by smoothing the airflow around the main rotor pylon 112 and by hiding the upper wire strike cutter 120 and equipment located behind the fairing. Referring to FIG. 3, fastening means 133 may be provided to make the fairing removable to thereby permit servicing of the wire cutter and any other equipment located in the vicinity of the cutter.

The fairing must fracture when struck by a wire/cable to enable the wire/cable to pass through to the wire cutter 120. Additionally, small diameter slack wires/cables must be retained until sufficient tension is developed in the wire/cable to fracture the fairing and then be cut by the wire cutter 120. To accomplish the above objectives, the fairing 122 is made of a typical radar absorbing structure with outer and inner dielectric face skins sandwiching a microwave energy absorbing honeycomb core. This type of structure provides the desired microwave energy absorbing characteristics to thereby reduce the radar signature. Additionally, a projection 135 is formed on the fairing 122 to catch slack wires/cables, thereby allowing sufficient tension to develop in the wire/cable to fracture the fairing. As will be described in greater detail hereinafter, a flaw is formed in the fairing 122 by scoring the inner dielectric face skin on the fairing to allow it to easily fracture in response to a wire/cable strike so that the wire/cable may be cut by the wire cutter.

Figure 4A:
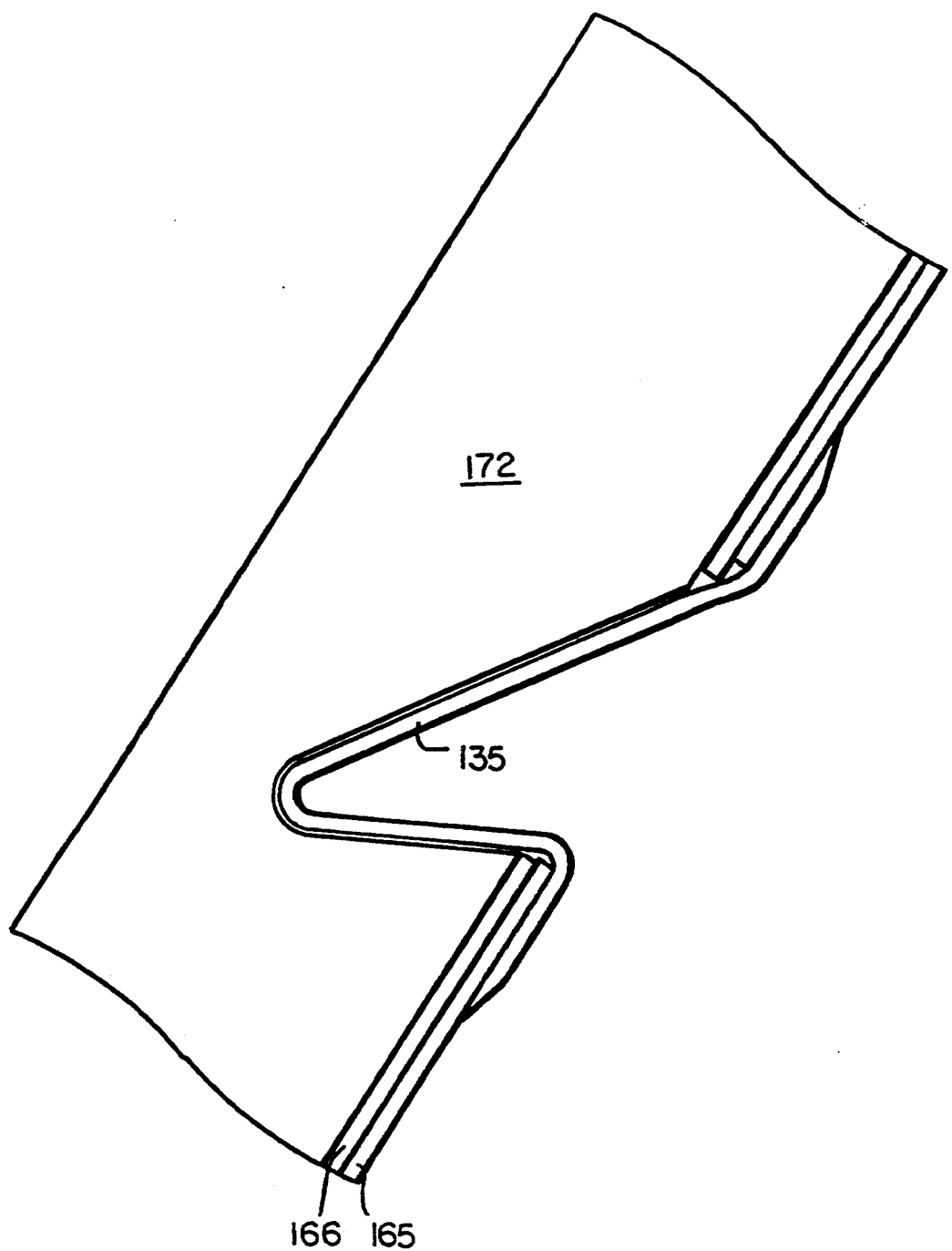
FIG. 4a is a sectional view taken along line 4—4 of FIG. 3, partially broken away, showing a projection and outer skin laid-up in a tool (mold) prior to curing.

Referring to FIG. 4a, a lay-up tool (mold) 172 is used to co-cure the projection 135 and the outer skin layers 165, 166. The projection 135 and skin 165, 166 are made of a dielectric material, e.g., preimpregnated Kevlar plies. The dielectric skin material allows microwave energy to pass through to be absorbed by the core material. During assembly of the fairing, the outer skin material and projection are placed in the mold 172 one layer (ply) at a time. The outer skin and projection are then debulked using a known debulking method. For example, a plastic sheet is draped over the entire mold 172, and the edges of the sheet are taped or otherwise adhesively attached to the mold 172. A port is attached to the plastic sheet, and a vacuum is drawn on the area between the sheet and the outer skin and projection. When the vacuum is drawn, atmospheric pressure pushes against the plastic sheet which in turn pushes the outer skin and projection against the mold 172. When the vacuum is drawn, the skin and projection are known as being "under compaction". The purpose of debulking is to remove any air bubbles which may be trapped between the skin layers. For improved results, the assembly is debuled after each ply layer is placed in the mold 172.

The outer skin and projection are then cured in a high temperature and pressure process, such as in an autoclave, to co-cure the skin and projection. The mold 172 is typically be made of epoxy, and provides an external surface on the mold side which closely approximates the final fairing shape. The co-cure of the projection and outer skin provides a thin outer skin layer having improved dielectric characteristics. This procedure also provides an outer skin surface having minimal dimpling and porosity.

Figure 4B:
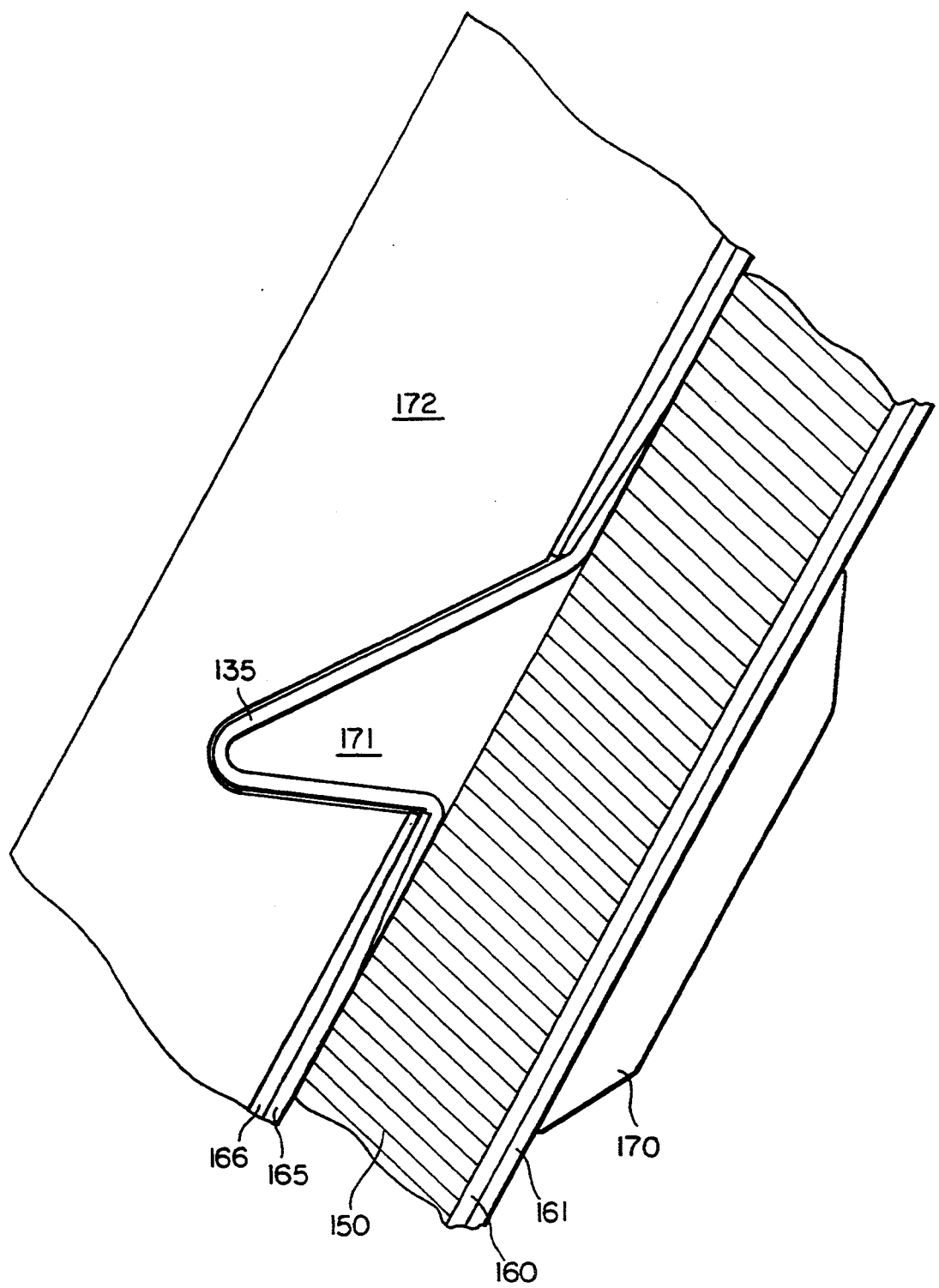
FIG. 4b is a sectional view taken along line 4—4 of FIG. 3, partially broken away, showing a honeycomb core and inner skin attached to the projection and outer skin prior to curing.

Referring to FIG. 4b, the core 150 is then attached to the outer skin and projection. The core 150 may be made of a honeycomb structure such as a treated Nomex honeycomb core. The treated core provides the desired microwave energy absorbing characteristics. The honeycomb structure is used to add strength and rigidity to the fairing while being lightweight. Alternatively, other types of suitable core material may be used such as a fiber reinforced foam or other suitable core material. During manufacture of the fairing, the core 150 is first formed into the general shape of the fairing. Next, the co-cured projection 135 and outer skin 165,166 are mounted onto the core 150. Film adhesive, e.g., epoxy film adhesive, is applied between the outer skin and the core for secure attachment and to fill any voids between the core and the outer skin. Next, layers (plies) of inner skin 160, 161 are mounted to the core 150 using film adhesive. The mold is debulked after each layer is applied to the mold. The projection 135 and skin layers 160,161,165,166 become permanently attached to the core when the fairing is cured, e.g., cured in a high temperature and high pressure cure process such as an autoclave process.

Once all of the layers of skin are mounted on the core, a caul plate 170 is used to distribute autoclave pressure around the inner skin section 152 opposite the projection. The caul plate prevents the autoclave pressure from causing the inner skin and core material from deforming into the void 171 between the projection and the core. The projection is co-bonded to the core with the outer skin 165, 166 during an autoclave cure of the entire fairing. By co-bonding the projection 135 to the core 150 with the outer skin 165, 166, the entire external surface around the projection 135 is smooth to satisfy aerodynamic considerations, and the entire outer surface of the fairing is coated with the dielectric skin material to satisfy radar signature and wire strike criteria. Additionally, by co-bonding the projection with the skin, the projection is securely attached to the core.

Figure 4C:
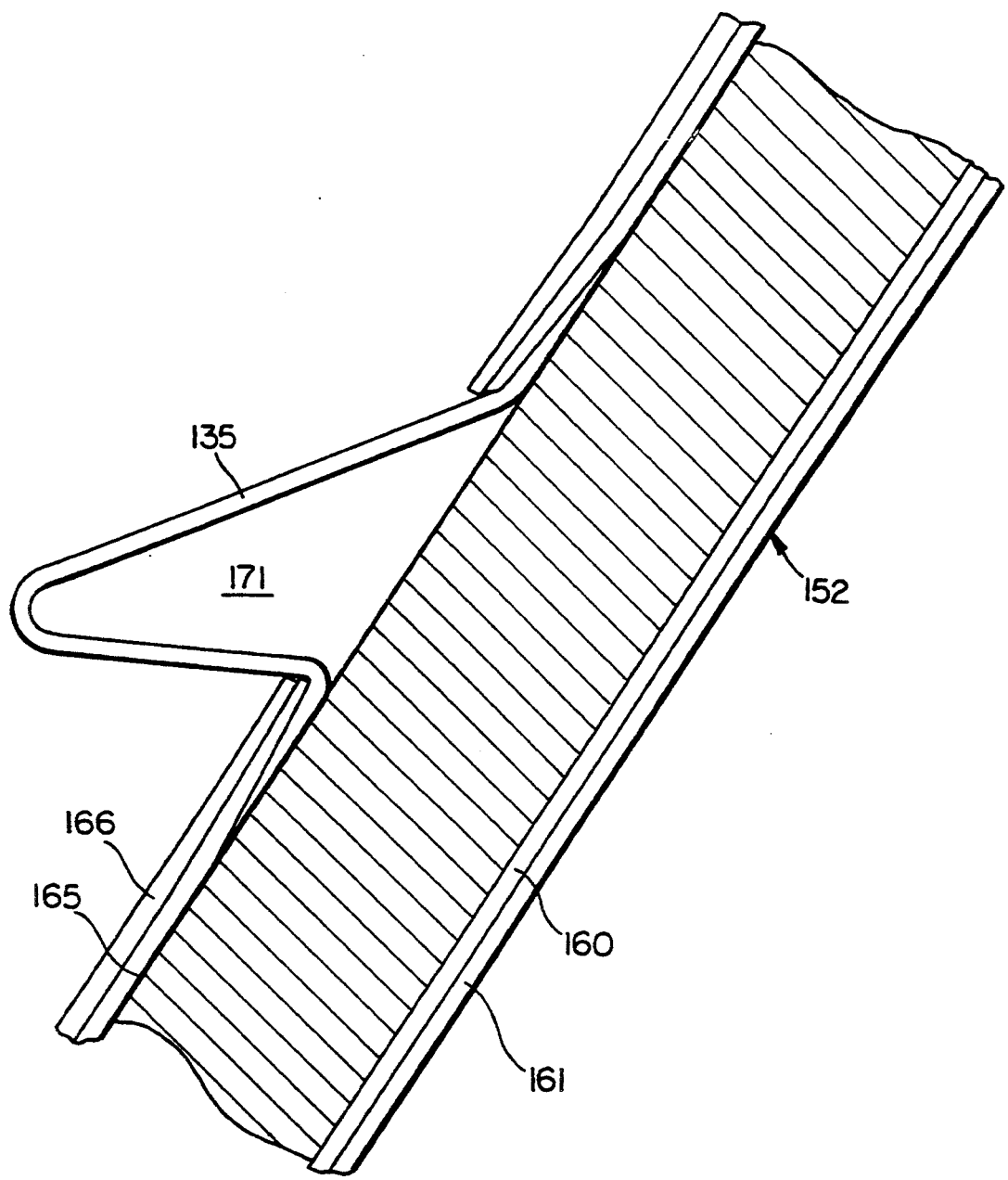
FIG. 4c is a sectional view taken along line 4—4 of FIG. 3, partially broken away, showing the cured fairing.
Figure 5:
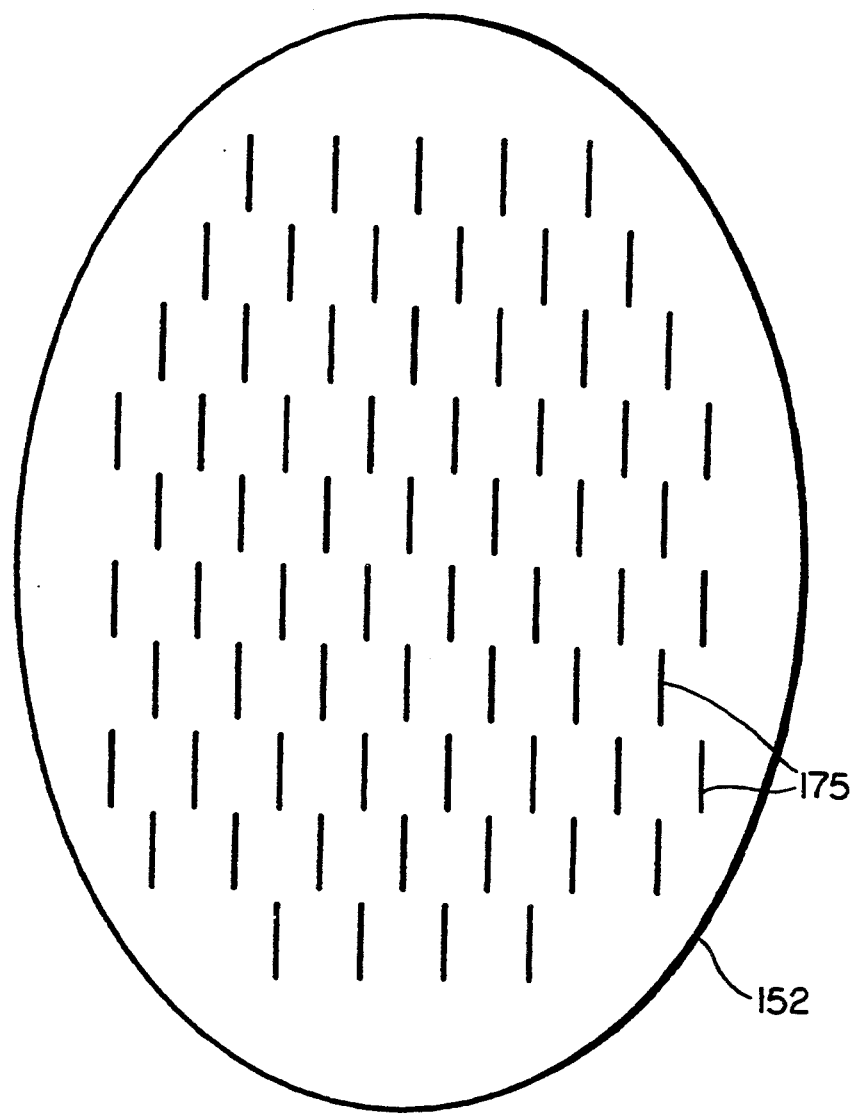
FIG. 5 is a top plan view showing a pre-cut failure initiation site on the fairing inner skin.

Referring now to FIGS. 4c and 5, both layers of inner skin 160, 161 are pre-cut (scored) 175 in a section 152 opposite the projection 135 before they are attached to the core 150 to provide a failure initiation site. The inner skin 160, 161 is only scored in the section 152 directly behind the projection. The scores 175 are placed in such a fashion on the inner skin to permit the skin to carry some shear load while assisting in the fracture of the fairing in response to a wire strike such that the wire or cable will be received into the jaws of the wire cutter. Alternatively, the inner skin 160, 161, is scored in the area of the projection 135 after it is attached to the core.

The invention has been described thus far as having a solid projection 135 for retaining wires that contact the fairing until there is sufficient tension in the wire to fracture the fairing. However, it may be desirable to provide an aperture in the projection and an aperture in the core so that the projection acts like a louver to allow air to pass trough and circulate behind the fairing for cooling of equipment in the vicinity of the fairing. A disadvantage of providing apertures in the projection and core is that aerodynamic performance may be degraded by the increased drag caused by the apertures. Additionally, although the invention is illustrated with only one projection on the fairing, a plurality of projections may be provided to further enhance the ability to retain wires.

The invention was described herein as being manufactured with Kevlar skin to thereby allow incident microwave energy to pass through to, and be absorbed by, the core material. However, any suitable low-dielectric, high strength skin material may be used such as dielectric fiberglass or quartz fiber.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

I claim:

1. An aircraft wire cutter system comprising:
   wire cutter means mounted on the aircraft for severing incident cables and wires to thereby provide protection against cable or wire strikes;
   a fairing for covering said wire cutter means, said fairing having a microwave energy absorbing core, a dielectric skin covering the core, said fairing fracturing in response to a cable or wire strike so as to permit said wire cutter means to sever incident cables and wires, and
   at least one projection being formed on said fairing for catching and holding cables or wires to permit tension to develop in the cables or wires to fracture said fairing, thereby permitting the cables or wires to pass through to said wire cutting means.

2. An aircraft wire cutter system according to claim 1 wherein said fairing is provided with an aerodynamic shape to minimize drag and direct airflow around said wire cutter means and equipment adjacent to said wire cutter means.

3. An aircraft wire cutter system according to claim 1 further comprising scores in said dielectric skin for providing a fairing failure initiation site in response to a wire or cable striking said fairing.

4. An aircraft wire cutter system according to claim 1 further comprising an aperture formed in said projection and an aperture formed in said core, thereby permitting air to circulate behind said fairing.

5. An aircraft wire cutter system according to claim 1 wherein said fairing is provided with an aerodynamic shape to minimize drag and direct airflow around said wire cutter means.

6. An aircraft wire cutter system according to claim 1 wherein in said fairing comprises an inner surface and an outer surface, said projection being mounted on said outer surface, said dielectric skin mounted on said inner surface comprising scores for providing a fairing failure initiation site in response to a wire or cable striking said fairing.

7. An aircraft wire cutter system according to claim 1 wherein said fairing comprises fastening means for removably mounting said fairing further to the aircraft.

8. An aircraft wire cutter system comprising:
   wire cutter means mounted on the aircraft for severing incident cables and wires to thereby provide protection against cable or wire strikes; and
   a fairing for covering said wire cutter means, said fairing having a microwave energy absorbing core, a dielectric skin covering the core, said fairing fracturing in response to a cable or wire strike so as to permit said wire cutter means to sever incident cables and wires, said dielectric skin having scores for providing a fairing failure initiation site in response to a wire or cable striking said fairing.

9. An aircraft wire cutter system according to claim 8 further comprising at least one projection being formed on said fairing for catching and holding cables or wires to permit tension to develop in the cables or wires to fracture said fairing, thereby permitting the cables or wires to pass through to said wire cutting means.

10. An aircraft wire cutter system according to claim 9 wherein said fairing is provided with an aerodynamic shape to minimize drag and direct airflow around said wire cutter means and equipment adjacent to said wire cutter means.

11. An aircraft wire cutter system according to claim 10 further comprising an aperture formed in said projection and an aperture formed in said core, thereby permitting air to circulate behind said fairing.

12. An aircraft wire cutter system according to claim 8 wherein said fairing is provided with an aerodynamic shape to minimize drag and direct airflow around said wire cutter means.

13. An aircraft wire cutter system according to claim 10 wherein said fairing comprises an inner surface and an outer surface, said projection being mounted on said outer surface, said dielectric skin mounted on said inner surface.

14. An aircraft wire cutter system according to claim 8 wherein said fairing comprises fastening means for removably mounting said fairing to the aircraft.

* * * * *